INVENTORS
WILLIAM C. EULER and
BY RICHARD C. REICHELT

Lockwood, Woodard, Smith & Weikart
Attorneys

INVENTOR.
WILLIAM C. EULER and
BY RICHARD C. REICHELT
Lockwood, Woodard, Smith & Weikart
Attorneys INVENTOR.
WILLIAM C. EULER and
RICHARD C. REICHELT
BY
Lockwood, Woodard, Smith & Weikart
Attorneys INVENTOR.
WILLIAM C. EULER and
BY RICHARD C. REICHELT
Lockwood, Woodard, Smith & Weikart
Attorneys INVENTOR.
WILLIAM C. EULER and
BY RICHARD C. REICHELT
Lockwood Woodard, Smith & Weikart
Attorneys INVENTOR.
WILLIAM C. EULER and
RICHARD C. REICHELT
BY
Lockwood, Woodard, Smith & Weikart
Attorneys Jan. 21, 1964 W. C. EULER ET AL 3,119,071

DIGITAL PATTERN GENERATOR

Filed March 30, 1961 7 Sheets-Sheet 7

INVENTOR.
WILLIAM C. EULER and
BY RICHARD C. REICHELT

Lockwood, Woodard, Smith & Weikart
Attorneys

United States Patent Office 3,119,071
Patented Jan. 21, 1964

3,119,071

DIGITAL PATTERN GENERATOR

William C. Euler, Champaign, and Richard C. Reichelt, Urbana, Ill., assignors to The Magnavox Company, Fort Wayne, Ind., a corporation of Delaware Filed Mar. 30, 1961, Ser. No. 99,415
18 Claims. (Cl. 328—187)

This invention relates generally to electrical signal generators and more particularly to a signal generator capable of producing series of pulses in a variety of patterns.

In the electronics art particularly those branches dealing with computers, communication systems, and telemetry, the utilization of electrical pulses is indispensable. The equipment involved is normally quite extensive and requires convenient means for testing thereof so that its operation can be relied upon. Because of the variety of pulse patterns which may be employed in the electronic equipment, it has been desirable to provide test equipment capable of producing a variety of patterns for testing purposes.

In addition to the utility of pulse patterns for test purposes, they are useful for other purposes including demonstration of codes, Fourier analysis, various types of radar displays, transient studies and computer studies.

It is, therefore, a general object of this invention to provide an instrument having the ability to produce a pulse pattern which can be changed by the flick of a switch.

It is a more specific object of the present invention to provide an instrument capable of producing an output waveform which can be varied in number of pulses, height of pulse, individual pulse length, and duration of the positive portion of a pulse with respect to the negative portion.

It is still another object of this invention to provide an instrument having the foregoing capabilities and in which the entire pulse pattern output can be inverted by the flick of a switch.

It is still another object of this invention to provide an instrument capable of producing pulses in patterns of variable lengths and singly or repetitiously.

It is still another object of this invention to provide an instrument having the foregoing capabilities and adapted to use with a number of other like instruments to produce pulse patterns of extraordinary length.

This invention includes in its scope a test instrument having a number of electronic components incorporated in groups or modules. These modules are arranged in a convenient enclosure whereby they can be separately removed, tested, and replaced if necessary to facilitate maintenance of the instrument in proper operating condition.

The electronic components of the instrument include an internal oscillator which supplies a controllable signal that is reshaped by shaping circuitry and used as a clock pulse. Provision is made so that an external oscillator may be coupled to the shaping circuits instead of the internal oscillator so that finer control or more precision pulse repetition rates can be obtained if desired. The unit which has been described thus far may be referred to generally as an oscillator unit.

The oscillator unit is coupled to two ring counters which are driven by the clock pulse. The ring counters include a number of flip-flop circuits arranged such that the "units" ring counter produces outputs in response to each clock pulse whereas the other ring counter (the "tens" ring counter) produces one output pulse for every ten output pulses from the units ring counter.

A coaxial switch selects the decimal number at which a pattern will end. This will occur at a time coincident between the units flip-flop and the tens flip-flop selected by the coaxial switch, at which time a cycle pulse is provided to clear both counters and initiate a new pattern.

Ten individual OR gates, each combined with an AND gate, give a serial output of each ten, twenty, thirty, etc. count. The OR gates are connected through manually operable two-position bit selector switches to the units ring counter, and the AND gates are connected to the tens ring counter as well as to the outputs of the OR gates. The AND gate outputs are fed to a NOR gate which gives a true serial output. The switches connected between the first ring counter and the OR gates can prevent ring counter output from affecting the pattern generator output pattern during certain time intervals or bits. Therefore, they are called bit selector switches and determine which outputs from the ring counters will be represented as positive pulses at the output of the generator. The OR, AND and NOR gates make up a digital to serial converter.

The output of the NOR gate is amplified and can be made available in amplified form at the pattern output terminal of the pattern generator. However, a symmetry control circuit is provided which can be coupled between the NOR gate output and the pattern output terminal to provide adjustment to the ratio of the width of the positive and negative levels of the output pulses.

A tone keyer unit may be coupled to the output unit so that a sinusoidal output can be provided which is keyed to the pattern output of the generator.

The full nature of the invention will be understood from the accompanying drawings and the following description and claims.

FIG. 1 is a block diagram of a typical pattern generator according to this invention.

FIG. 2 consists of two portions 2A and 2B on separate sheets and is a logic diagram of the generator of FIG. 1.

Figure 1:
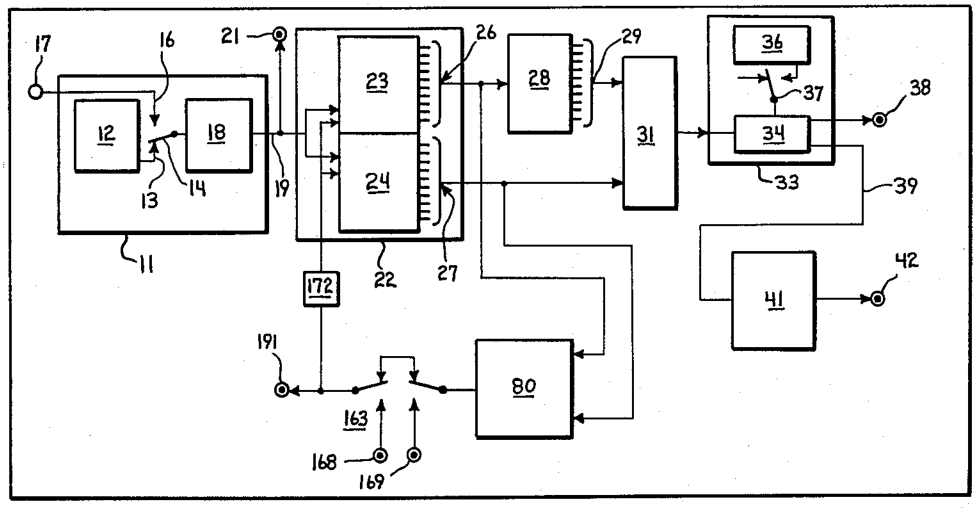

Referring to FIG. 1 which is a block diagram of a typical embodiment of our invention, the block 11 represents the oscillator unit. It includes a variable oscillator 12 having an output terminal 13 which is one fixed contact of a switch 14. The other fixed contact 16 of the switch 14 is connected to an input connector 17. Operation of the switch 14 makes possible to use the variable oscillator 12 in the oscillator unit for an input or in the alternative, to use signals from a separate oscillator coupled to connector 17 if more precision is desired. The switch 14 is connected to pulse shaping circuitry 18 producing an output from the oscillator unit on the conductor 19.

The output signals on conductor 19 are negative going and constitute clock pulses used in our invention. A separate terminal 21 is provided to make the clock pulses available for connection to other equipment. The output conductor 19 is connected to the block 22 which designates generally the counting means of our invention. The counting means includes two ring counters 23 and 24. The ring counter 23 is the units ring counter and has an input from the conductor 19. The counter 24 is the tens ring counter and also has an input from the conductor 19. The output from the units ring counter is derived from any one of ten output conductors designated generally by the reference numeral 26, and similarly the output from the tens ring counter is available by means of ten separate conductors designated generally by the reference numeral 27.

The ten conductors, from the units ring counter are connected in turn to a battery 28 of bit selector switches. The output from the bit selector switches is available on one-hundred conductors or wires designated generally by the reference numeral 29 and coupled to a digital to serial converter 31.

The ten wires carrying the output from the tens ring counter are also coupled to the converter 31 which produces a sequence of pulses from the digital information provided by the ring counters. The output from the converter 31 is available on the conductor 32.

Conductor 32 from the converter 31 is coupled to an output unit 33 which includes a power amplifier 34 and a symmetry control circuit 36. A symmetry switch 37 is also included in the output unit whereby the symmetry control can be eliminated or employed as desired to control the pattern output from the amplifier 34 produced at the pattern output terminal 38.

An output from the amplifier 34 is taken on conductor 39 and applied to a tone keyer unit 41 to produce a sinusoidal tone output at the terminal 42, keyed to the pattern output at terminal 38.

A cycle length control 80 is coupled to the outputs of the ring counters and provides for termination of a cycle after a certain selectable number of pulses. The output of the cycle length control is coupled to a cycle switch 163. Switch 163 permits coupling the output of the cycle length control, back to the ring counters through a reset switch 172, or coupling it to an output terminal 169 for cascade operation. Switch 163 also accommodates coupling of an input from terminal 168 through reset switch 172 to the ring counters during cascade operation.

Figure 2A:
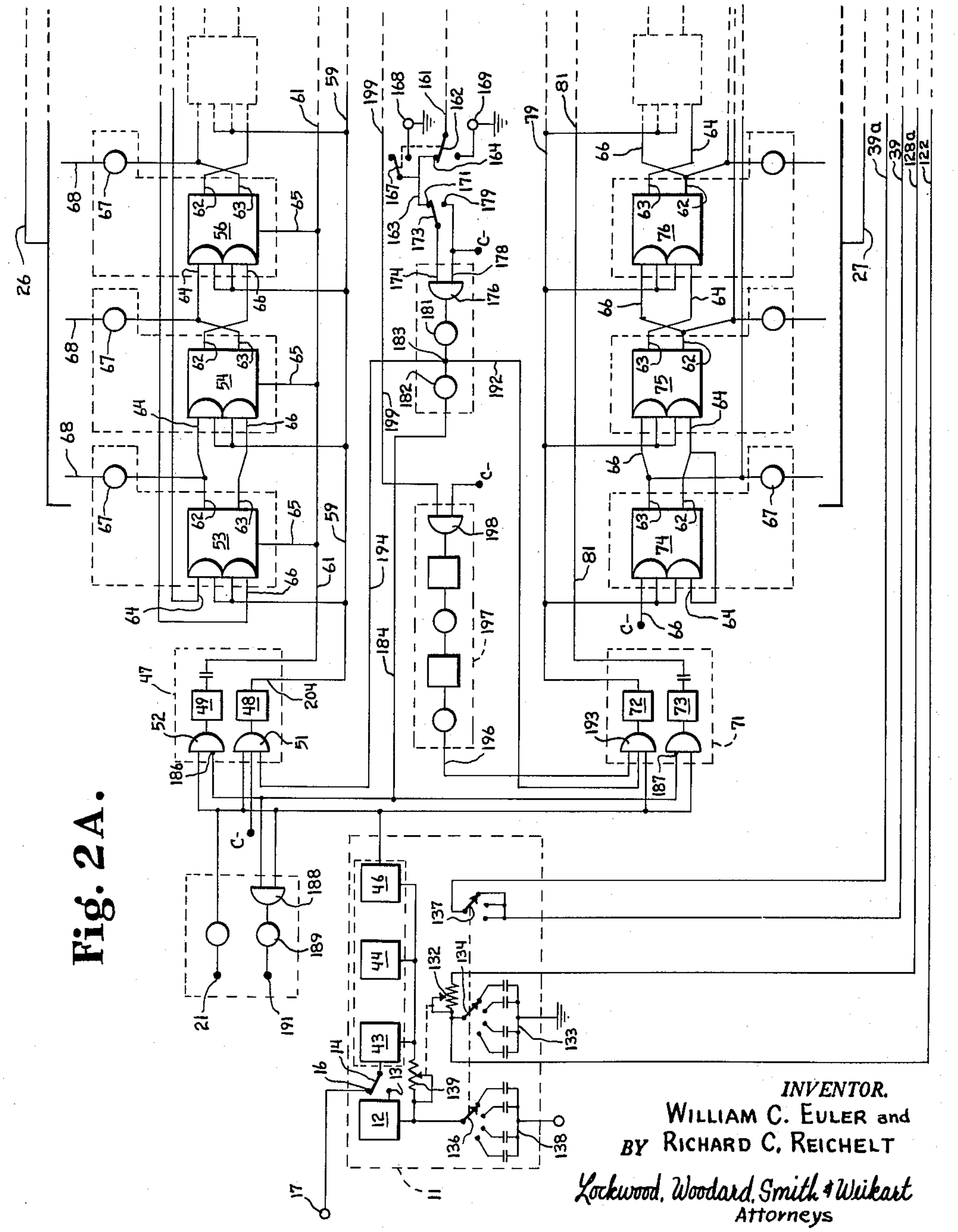
Figure 2B:
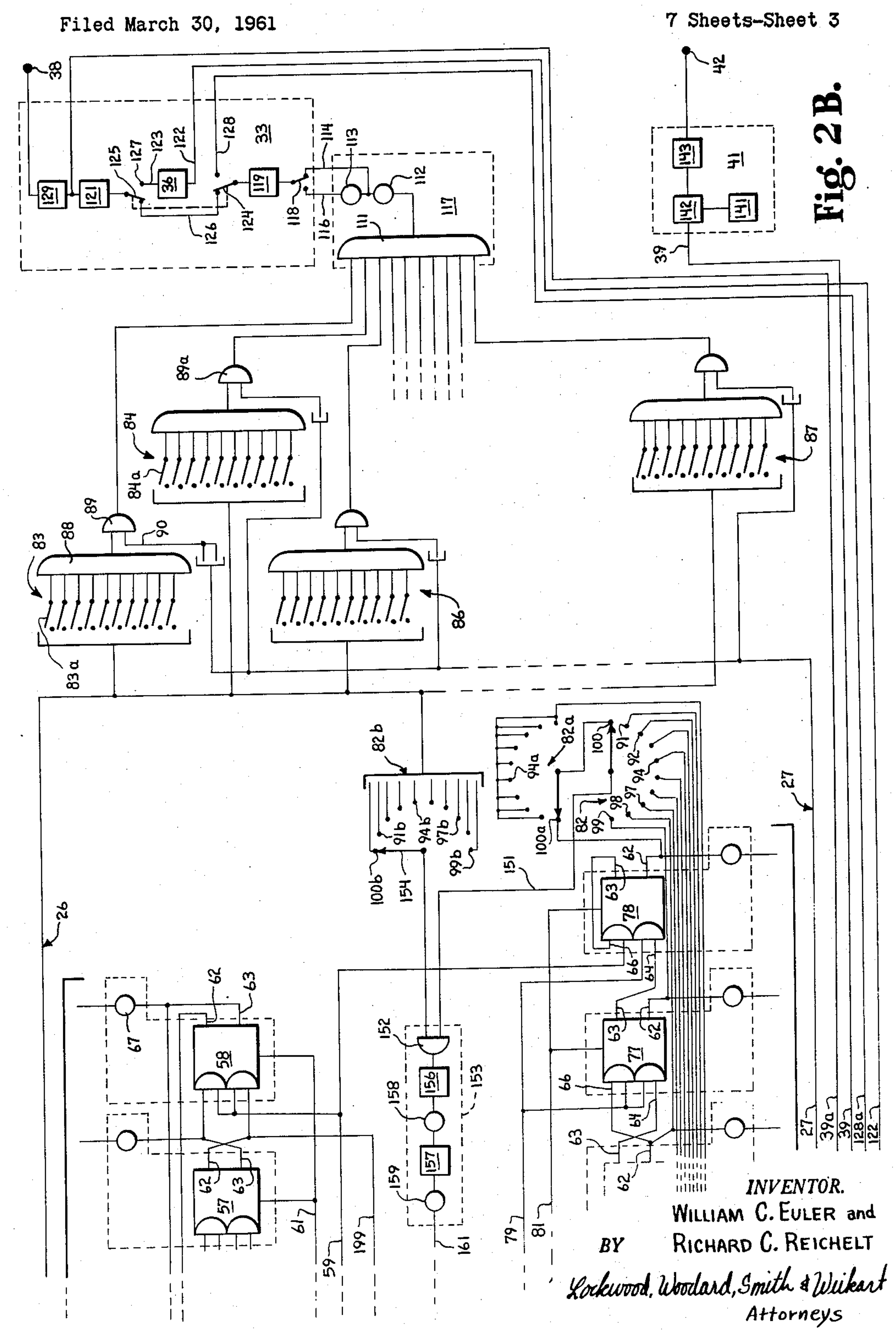

Referring to FIG. 2, the logic diagram of the invention is shown and the reference numerals used in FIG. 1 will be applied also in FIG. 2. The oscillator unit 11 includes the oscillator 12 which may be a conventional free-running multivibrator or relaxation oscillator. With such an oscillator, as is well known, pulse repetition rates from 10 to 200,000 pulses per second can readily be obtained. The oscillator and the input terminal 17 have contacts 13 and 16, respectively, which may be connected alternatively by the switch 14 to the pulse shaping circuitry 18. By provision of the switch 14, more precision repetition rates may be obtained by connecting an external oscillator of greater capability to terminal 17.

The pulse shaping circuitry 18 may include a Schmitt trigger circuit 43 having an output coupled to a one shot multivibrator 44. The output of the multivibrator 44 is coupled to an emitter follower 46 to produce the clock pulse output on conductor 19.

The clock pulse output is connected from conductor 19 to the first units ring counter 23 at the drive unit 47 thereof. This drive unit includes a shift drive 48 and a clear drive 49 coupled to the various flip-flops included in the units ring counter. The clock pulses from conductor 19 are coupled to the shift drive and the clear drive through the AND gates 51 and 52, respectively.

A group of ten identical binary signal control means or flip-flops is incorporated in the units ring counter and for convenience in drawing, only five of these flip-flops are illustrated. The flip-flops which are illustrated will be numbered 53, 54, 56, 57 and 58. The output from the shift drive 48 is available from conductor 59 to the trigger input terminal 60 of each of the ten flip-flops. The output from the clear drive 49 is capacitively coupled to the conductor 61 from which it is available also to the clear drive input terminals 65 of all ten flip-flops.

Each of the flip-flops has two separate output conductors which for each of the flip-flops will be numbered 62 and 63. In addition to the inputs to the flip-flops from the conductors 59 and 61, each flip-flop has two inputs which for all flip-flops will be numbered 64 and 66. The connections between the outputs of each flip-flop to the inputs of the next succeeding flip-flop are important and should be therefore, noted carefully. The output conductor 62 of flip-flop 53 is connected to the input conductor 64 of the flip-flop 54. The output conductor 63 of the flip-flop 53 is connected to the input conductor 66 of the flip-flop 54. However, the output 62 of flip-flop 54 is connected to the input 66 of flip-flop 56 and the output 63 of flip-flop 54 is connected to the input 64 of flip-flop 56. The outputs of flip-flop 56 are connected to inputs of the next succeeding flip-flop (not shown in FIG. 2) in the same manner as the outputs of flip-flop 54 are connected to the inputs of flip-flop 56. Each succeeding flip-flop is likewise connected to the next preceding flip-flop and this illustrated in the connection of the flip-flop 58 to flip-flop 57. However, it should be noted that the output from conductor 62 of flip-flop 58 is connected to the input 64 of flip-flop 53. Also, the output 63 of flip-flop 58 is connected to the input 66 of flip-flop 53.

The output signals from the flip-flops will be distinguished by referring to those coupled to the bit selector switches as the digital information output signals. The information output signals from each of the flip-flops are obtained at the input conductors 64 of the next succeeding flip-flop in all cases with the exception of the output from flip-flop 53. The digital information from the first flip-flop 53 is available on the conductor 62 thereof and provides an input to the conductor 64 of flip-flop 54. This same information on conductor 62 and input 64 is coupled through simple transistor buffer inverter 67 to an output conductor 68 which is one of the ten conductor designated generally in FIG. 1 by the reference numeral 26.

The information output from conductor 63 of the flip-flop 58 and which is connected through a buffer inverter 67 to one of the ten wires, is also connected to the input 66 of the flip-flop 53 and, as noted above, this is the only instance in which the information output signal from a flip-flop to its associated buffer inverter is not also applied to the input conductor 64 of another flip-flop.

The tens ring counter 24 includes a drive unit 71 having a shift drive 72 and a clear drive 73 which are similar in construction to the shift drive 48 and clear drive 49 of the units ring counter. The tens ring counter includes eleven flip-flops which may be of the same construction as the flip-flops used in the ring counter and for purposes of convenient illustration, only five of these flip-flops are shown in the drawing. The flip-flops are designated generally by the reference numerals 74, 75, 76, 77 and 78. The inputs and outputs of these flip-flops are numbered in the same manner as those of the units ring counter for convenience of explanation and understanding.

In a manner similar to that employed in the units ring counter, the output from the shift drive 72 is available from the conductor 79 to the inputs of each flip-flop. Also, the output from the clear drive 73 is available on conductor 81 to each of the flip-flops. The input 66 of flip-flop 74 is connected to a constant source of negative potential. The input 64 of flip-flop 74 is connected to the output 62 thereof. The output 62 of flip-flop 74 is connected to the input 64 of flip-flop 75. The output 63 of flip-flop 74 is connected to the input 66 of flip-flop 75. However, it should be noted that the output 62 of flip-flop 75 is connected to the input 66 of the next succeeding flip-flop 76 and the output 63 of flip-flop 75 is connected to the input 64 of flip-flop 76. Connections like those between flip-flops 75 and 76 are then carried through to the flip-flop 77 whose inputs 66 and 64 are connected, respectively, to the outputs 62 and 63 of the next preceding flip-flop (not shown in FIG. 2).

The output 63 of flip-flop 77 is connected to the input 64 of flip-flop 78. The output 62 of flip-flop 77 is connected to terminal 99 of the cycle length switch section 82. The output 63 of flip-flop 78 is connected to the input 66 of the same flip-flop 78. The output 62 of flip-flop 78 is connected to terminal 100*a* of the cycle length switch section 82*a*.

The digital information output signals from the flip-flops of the tens ring counter are obtained from the output conductors 62 of all of the flip-flops with the exception of flip-flops 74. The digital information from the flip-flops 74 is taken from its output conductor 63. The digital information from the flip-flops is taken through buffer inverters 67 which may be identical to those of the units ring counter and the output from the inverter connected to each flip-flop is available on one of ten conductors or wires designated generally in FIG. 1 and in FIG. 2 by the reference numeral 27.

The ten conductors from the units ring counter are connected to each of ten banks of two-position bit selector switches. There are 10 switches in each bank and each switch in every bank is connected to a separate one of the ten conductors. For clarity of illustration, only four banks of bit selector switches are shown and these are designated by reference numerals 83, 84, 86 and 87. The bit selector switches are all shown in the open position. Of course, in this position, no information from the ring counters could appear at the output of the bit selector switches.

Each bank of bit selector switches is connected to the digital to serial converter 31 through an OR gate which is a portion of the converter. For example, bank 83 is connected through the OR gate 88 to the inverter-AND gate 89. In addition to the output from the OR gate 88, an input to the inverter-AND gate 89 can be provided from one of the ten wires 27 carrying the information from the tens ring counter and coupled to gate 89.

Each of the inverter-AND gates connected to an OR gate of the converter is connected to one of the ten output conductors 27 from the tens ring counter flip-flops. It should be noted that the output conductors from the buffer inverters associated with the flip-flop 74 and the flip-flop 78 are both connected together to one of the ten conductors 27 and are thereby coupled to one of the inverter-AND gates of the converter. In this description, they will be considered connected to the inverter-AND gate 89.

The output conductors from the inverter-AND gates of the converter are all connected to the OR gate 111 of the converter. The output conductor from this OR gate is connected to a first inverter 112 which is connected in turn to a second inverter 113. The output from the first inverter 112 is made available on a conductor 114 and the output from the second inverter is made available on the conductor 116. The combination of the OR gate 111 with the inverters 112 and 113 constitute the NOR gate 117 of the converter 31. The conductors 114 and 116 were designated generally in FIG. 1 by reference numeral 32.

The conductors 114 and 116 from the NOR gate provide the input to the output unit 33. By providing the two conductors, either can be coupled to a contact for the switch 118 in the output unit making possible inversion of the pattern output from the generator at terminal 38. The switch 118 is connected to a power amplifier designated generally in FIG. 1 by reference numeral 34 and which includes the amplifier 119 and the amplifier 121. The symmetry control 36 is included in the output unit and is provided with an input conductor 122 and an output conductor 123.

The symmetry switch 37 of FIG. 1 includes a pair of switching elements 124 and 125 which, as shown in FIG. 2, are linked for operation in unison. In the position shown in FIG. 2, these elements provide a direct electrical path through the conductor 126 between the amplifiers 119 and 121.

A pair of electrical contacts 127 and 128 is provided so that in the alternate position of the switching elements 124 and 125, the symmetry control circuit is coupled between the amplifiers 119 and 12.

The output from amplifier 121 is fed to an output drive circuit 129 which produces an output at the pattern output terminal 38.

The electrical contact 128 and the conductor 122, providing an input path to the symmetry control circuit 36, are connected to each other through conductor 128*a* and a variable resistor 132 located in the oscillator unit 11. A group of capacitors 133 is provided with a selector switch 134 which operates in unison with selector switches 136 and 137. The selector switch 136 is coupled to the oscillator 12 and operates with the group of capacitors 138 to permit selection of ranges of frequencies of operation of the oscillator 12. A variable resistance 139 is coupled to the oscillator and to the pulse shaping circuitry to provide a vernier control by which a specific frequency in any of the ranges selected by switch 136, may be obtained. The variable resistors 139 and 132 are linked and the selector switches 134 and 136 are linked for coordination of the symmetry control 36 with the operation of the oscillator.

A third selector switch 137 is linked to the switches 134 and 136 and permits connection of the output of amplifier 121 on conductor 39*a* to the input conductor 39 of the tone keyer unit 41. The tone keyer unit includes a Wien bridge oscillator 141 coupled through a buffer stage to a tone keyer 142. The input from the conductor 39 and from the Wien bridge oscillator 141 are combined to produce an output to the tone output driver 143 which in turn produces an output at the tone output terminal 42.

The cycle length control 80 of FIG. 1 includes a cycle length switch comprising three ten-position switch sections shown and designated generally in FIG. 2 as switches 82, 82*a* and 82*b*. These switches are used to control the length of cycle and in the embodiment illustrated of the invention can be adjusted to produce a cycle length of from one to one-hundred pulses. The switch 82 is used to determine in which successive group of ten pulses a cycle shall end and the switches 82*a* and 82*b*, which are linked to operate in unison, are used to select the units or the specific pulse in the selected group of ten pulses at which a cycle will be completed and a new cycle initiated. The manual control of the sections 82 and 82*a* and 82*b* is usually provided in the form of a coaxial unit with the units control knob in the center and the tens control knob encircling it.

The movable contactors of the switches 82, 82*a* and 82*b* are shown positioned in contact with the fixed contacts 100, 100*a* and 100*b*. In this position of the movable contactors, a cycle length of one hundred pulses may be produced.

Referring particularly to the switch 82, the fixed contactor 100 thereof is connected directly to the movable contactor of switch 82*a*. The fixed contact 91 of switch 82 is connected to the output 62 of the flip-flop 75. Each of the other fixed contacts of switch 82 is connected to an output 62 of a flip-flop in the tens ring counter. For example, the contact 99 is connected to the output 62 of the flip-flop 77. The contact 98 is connected to the output 62 of the flip-flop (not shown in FIG. 2) next preceding flip-flop 77, the contact 91 is connected to the output 62 of flip-flop 75, and the contact 92 is connected to output 62 of flip-flop 76.

The fixed contact 100*a* of switch 82*a* is connected to the output 62 of flip-flop 78. Each of the other fixed contacts, i.e. 91*a*, 92*a*, etc. of the switch 82*a* is connected to the output 63 of the flip-flop 74. The movable contactor of switch 82 is connected through the conductor 151 to an AND gate 152 of the delay inverter 153, also a part of the cycle length control 80.

Referring to switch 82*b*, the fixed contact 91*b* thereof is connected to the one of the wires or conductors 26 carrying digital information from the flip-flop 53 of the units ring counter. Similarly, each of the other fixed contacts of the switch 82*b* is connected to one of the ten conductors 26 from the flip-flops of the units ring counter. The movable contactor 154 of switch 82*b* is connected to and provides an input for the AND gate 152.

The delay inverter 153 includes two delay branches 156 and 157 followed by inverters 158 and 159, respectively. The output at conductor 161 resulting from a signal from the AND gate 152 is connected to the movable contact 162 of the cycle switch 163.

The cycle switch 163 includes two sets of contacts and in the position shown with the movable contactor 162 connected to the fixed contact 164, provides an electrical path from the delay inverter 153 to the cycle switch output conductor 166. The other set of contacts includes a movable contactor 167 which is linked to the contactor 162 and which in the position shown, performs no function. With the cycle switch in the position shown, the output from the delay inverter 153 is capable of producing complete pattern cycles repetitiously. In the alternate position of the movable contactors of switch 163, these contactors are coupled to terminals 168 and 169. In that condition, the output from the delay inverter is available at the terminal 169 for coupling to an input such as terminal 168 of another separate pattern generator for operation in cascade.

If, on the other hand, single cycle operation is desired, the cycle switch can be placed in this same position, i.e., the position for cascade operation, at which time grounding plugs are used in the terminals 168 and 169.

The conductor 166 is connected to a fixed contact 171 of the reset switch designated generally by reference numeral 172. The movable contactor 173 of the reset switch is normally closed on the fixed contact 171. This movable contactor is connected to the input 174 of the AND gate 176 of the inverter 177. The other input to the AND gate 176 is provided through the conductor 178 which is connected to the C— source of negative potential. Also, connected thereto is the fixed contact 179 of the reset switch 172.

The inverter 177 includes two inverter units 181 and 182 with the output from the AND gate 176 fed into the inverter unit 181. A junction 183 between the two inverter units provides a signal source which is useful as will be apparent subsequently. The output from the inverter 177 is coupled through the conductor 184 to the inputs 186 and 187 of the AND gates supplying the clear drives 49 and 73, respectively. The conductor 184 is also connected to the AND gate 188 which is connected in turn through the inverter 189 to a cycle pulse output terminal 191.

A conductor 192 is coupled from the junction 183 in the inverter 177 to the AND gate 193 coupled to the shift drive 72. A conductor 194 is connected from the junction 183 to the AND gate 51 coupled to shift drive 48. A third input to the AND gate 51 is connected to the C— source of potential.

A third input to the AND gate 193 is provided by way of conductor 196 from a delay inverter 197. The delay inverter 197 may be identical in construction to the delay inverter 153. The AND gate 198 of inverter 197 receives one source of input from the C— source of potential. Another input is available to the AND gate 198 by way of conductor 199 connected between the AND gate and the output 62 of the flipflop 57.

Figure 3:
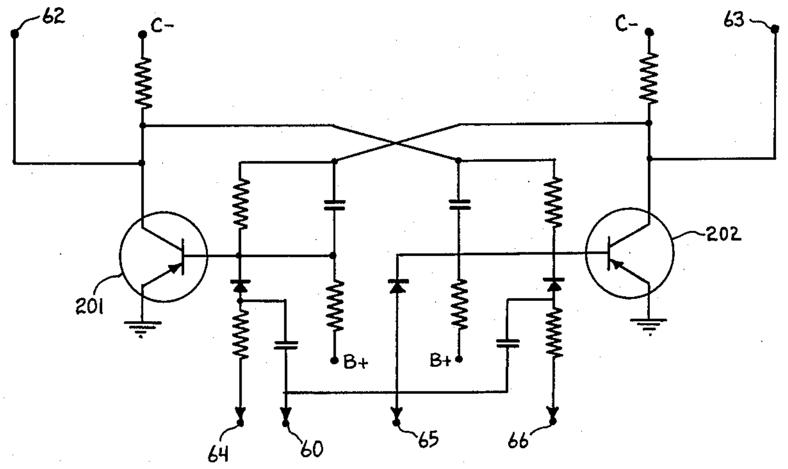
FIG. 3 is a schematic diagram of the flip-flop circuits which may be employed according to this invention.

Referring to FIG. 3, there is shown a schematic of a flip-flop of conventional construction and operation and of the type used in our invention. The transistors are arranged in common emitter configuration with the collectors coupled through appropriate resistances to the C— source of potential. The two outputs of the flip-flop are available from the collectors of the transistors 201 and 202 at the terminals 62 and 63 respectively. The inputs, in addition to those of steady potential from the B+ and C— sources, are provided for at terminals 64 and 66, 60 and 65. The shift drive pulses are applied to the terminal 60 and clear drive pulses are applied to terminal 65. The inputs to the terminals 64 and 66 depend upon the position of the flip-flop in the ring counters and will become apparent as the description proceeds.

For purposes of description of the operation of the invention and some of the elements such as the flip-flop of FIG. 3, some exemplary values will be given for the various potentials and will include, for example only, a positive potential of twenty-four volts for B+, twenty-four volts negative potential for B—, six volts of negative potential for C—, and zero volts for ground. With these voltages applied to the flip-flop of FIG. 3 and assuming that the clear state is that which exists when the transistor 201 is conducting, the potential at the output terminal 62 is zero volts and the potential at output 63 is six volts negative. With the flip-flop in the unclear or ones state, the potential at terminal 62 is six volts negative and at terminal 63 is zero volts. By virtue of the arrangement of the flip-flops in the ring counters, the potentials at the input terminal 64 and 66 will be either zero or six volts negative. If one is at zero volts, the other will be at six volts negative and vice versa.

In the clear state of the flip-flop, if the voltage at terminal 64 is six volts negative and at terminal 66, is zero, the positive going pulse from the shift drive applied to the terminal 60 will not change the condition of the flip-flop. However, if the flip-flop is clear, and the voltage at terminal 64 is zero and at terminal 66 is six volts negative, the positive going shift drive pulse at terminal 60 will change the state of the flip-flop to the unclear or ones state. When the flip-flop is in the unclear state, a positive going shift drive pulse is effective to reset the flip-flop to the clear or zero state only when the potential at input 64 is six volts negative and potential at input 66 is zero. However, a clear drive pulse at terminal 65 will clear the flip-flop regardless of whether the inputs at terminals 64 and 66 are at the zero or six volt negative potential.

Figure 4:
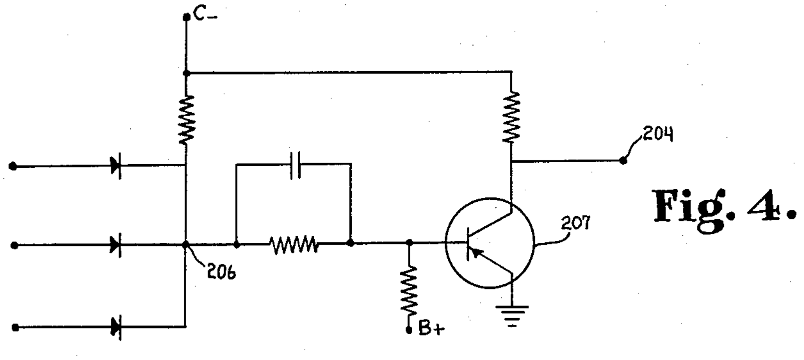
FIG. 4 is a schematic diagram of the shift drive circuit which may be employed according to this invention.

FIG. 4 is a schematic diagram of the shift drive and the AND gate coupled thereto. The operation of the shift drive is conventional and for the purposes of the description to follow, it should be understood that if any of the inputs to the AND gate is at zero potential, the output of the AND gate at the junction 206 would be at zero potential. Accordingly, the transistor 207 is reverse biased and the output at the terminal 204 is six volts negative. On the other hand, if all of the inputs to the AND gate are at six volts negative, the potential at the junction 206 is six volts negative, and the transistor 207 will be forward biased to produce an output at terminal 204 at ground potential or zero volts. This output occurring when all the inputs to the AND gate are at six volts negative potential constitutes the shift drive pulse. When this condition exists it is said that the AND gate is satisfied.

While a schematic diagram of the clear drive is not included, it should be understood that it too may be of conventional construction and, in fact, identical to the shift drive with the exception of a capacitive coupling between the collector of the transistor 207 and the output terminal 204 and a resistive coupling between the output terminal 204 and ground.

Figure 5:
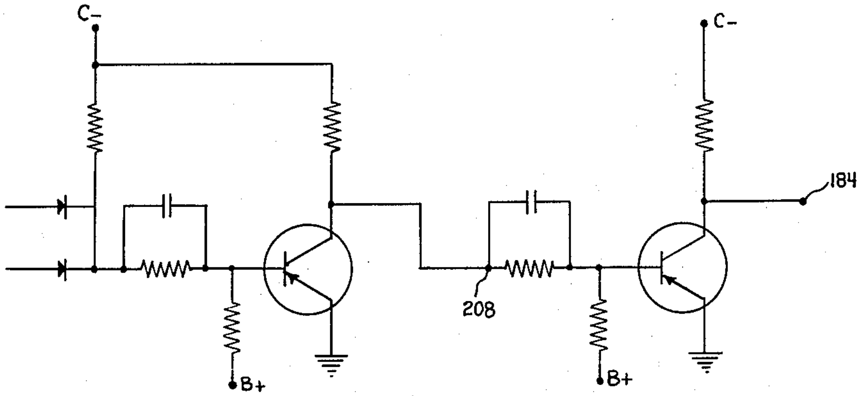
FIG. 5 is a schematic diagram of an inverter circuit employed in this invention.

FIG. 5 is a schematic diagram of a simple inverter circuit such as that shown at 177 in FIG. 2. The portion between the junction 208 and output conductor 67 is an example of the type of structure which may be employed in the buffer inverter 67 of FIG. 2. Because the construction is conventional, it is believed that no description of the operation is necessary.

Figure 6:
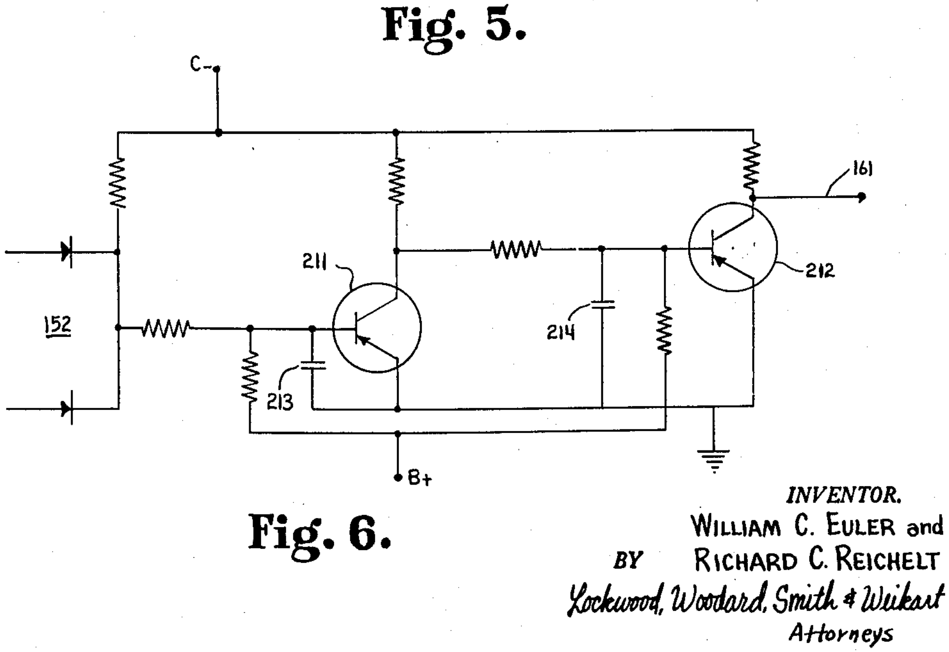
FIG. 6 is a schematic diagram of a delay inverter employed according to this invention.

FIG. 6 is a schematic diagram of a delay inverter such as may be employed for delay inverters 153 and 197 in FIG. 2. In this inverter, if the AND gate conditions are not satisfied, transistor 211 is turned off and transistor 212 is turned on producing ground potential at the output conductor 161. If AND gate conditions are satisfied, a six volt negative signal is produced at conductor 161. The delay is provided by the charge and discharge time of the capacitors 213 and 214.

Figure 7:
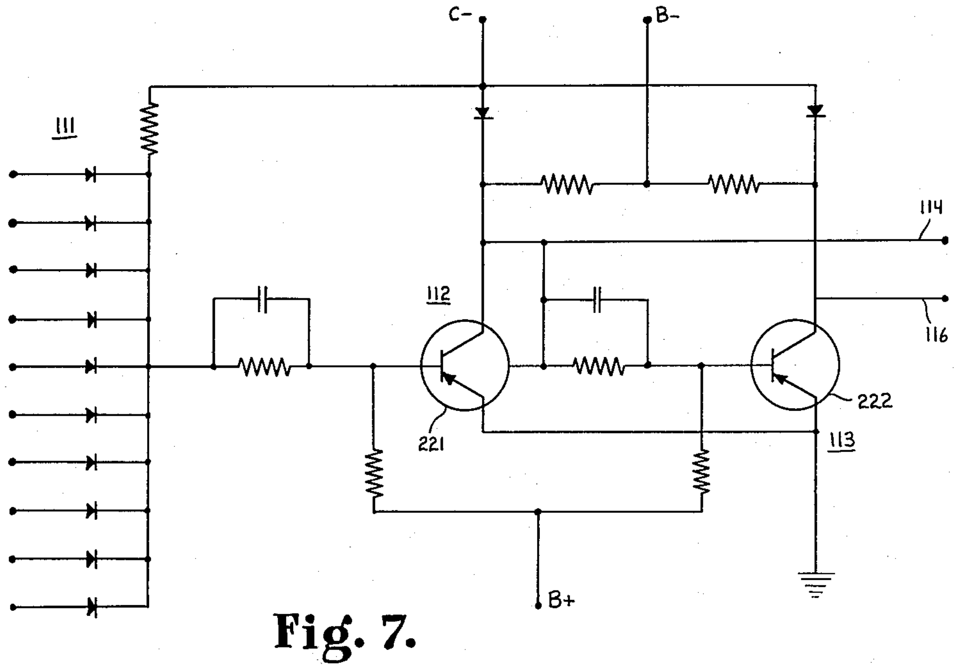
FIG. 7 is a schematic diagram of the NOR gate employed according to this invention.

FIG. 7 is a schematic diagram of the NOR gate which includes the OR gate 111 together with the two inverters 112 and 113 making available two different outputs at the terminals 116 and 117. If, and only if, all of the OR gate leads are at six volts negative, transistor 221 will be forward biased giving a zero level at the output terminal 114. This will result in a six volts negative output from the second transistor 222. When any or all of the OR gate leads are at zero level, transistor 221 will be reverse biased producing six volts negative at the output terminal 114 and a zero level at the output terminal 116.

Figure 8:
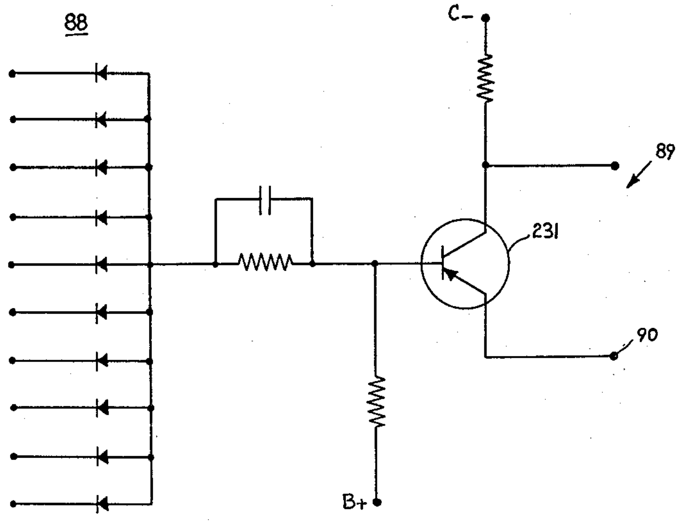
FIG. 8 is a schematic diagram of the OR and Inverter-AND gate employed according to this invention.

FIG. 8 is a schematic diagram illustrating the typical construction of the OR gate coupled to the bit selector switch bank and producing an output to the inverter-AND gate 89. The terminal 90 connected to the emitter of the transistor 231 is provided to receive input signals from the tens ring counter.

Figure 9:
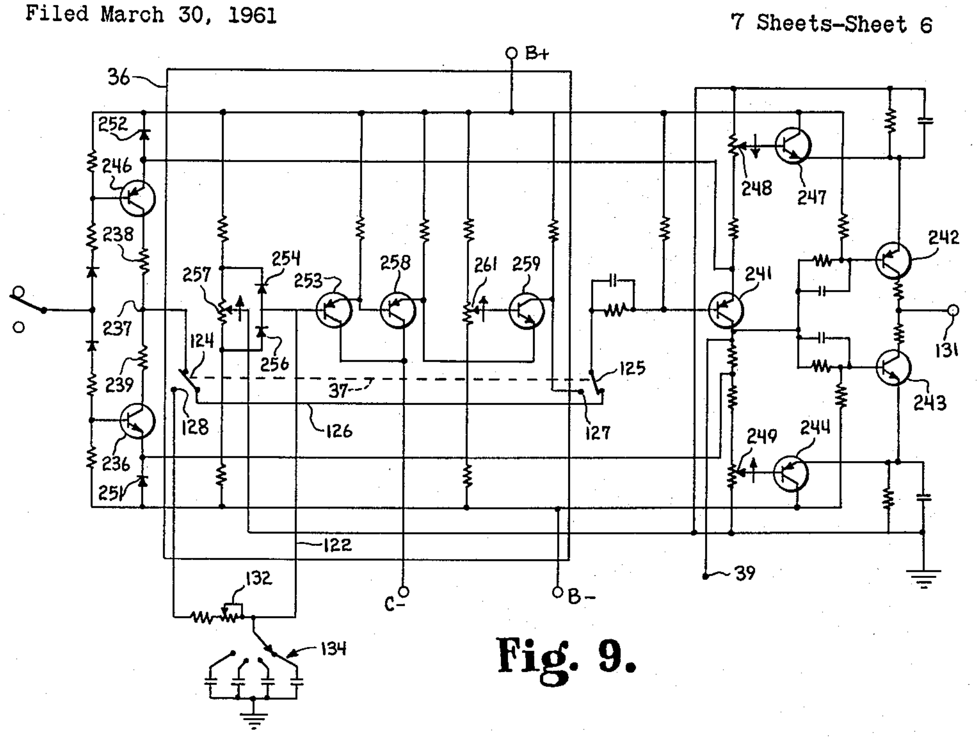
FIG. 9 is a schematic diagram of the Output Unit employed according to this invention.

FIG. 9 is a schematic diagram of the basic output unit 33. It consists first of an input drive (complementary symmetry circuit) followed by a symmetry control circuit which drives a final output stage. The complementary symmetry circuits ensure that a truly symmetrical output impedance is achieved. The symmetry control circuit may be switched in or out. When it is by-passed, as noted above, the input drive is fed directly to the final output stage which includes an amplifier and output drive.

With the input at zero level, the NPN transistor, 236, will be conducting giving approximately a −18 volts at the junction 237 of resistors 238 and 239. Considering the Symmetry control switch 37 in the Off position whereby its movable contactors 124 and 125 disconnect the symmetry control circuit, the −18 v. level will be applied to the base of transistor 241 and cause it to switch to the "On" state applying a positive 18 v. level to the base leads of the final two output transistors, 242 and 243, and by way of output conductor 39, to the tone keyer (not shown in FIG. 9). Since transistor 242 is a PNP transistor, it will be reverse biased to cutoff. However, since transistor 243 is an NPN, it will be forward biased to the "On" condition, and whatever voltage is applied to its emitter will appear at the output. The output voltage is controlled by the emitter follower transistor 244.

In a similar manner, with a level of −6 v. at the input drive circuit, PNP transistor 246 will be conducting or forward biased, thus making +18 v. appear on the base lead of transistor 241. This transistor is reverse biased to cut off and causes a −18 v. to appear at the base of the output transistors, 242 and 243, making PNP transistor 242 forward biased. This results in a voltage corresponding to the particular setting of the base of transistor 247 (power transistor) to appear at the output. Potentiometers 248 and 249 may be operated by Positive and Negative Level controls on a front panel of our generator and provide the voltage setting to the power transistors. For proper operation, the leads connecting the emitters of transistors 246 and 236 to the following stage should be at approximately plus 18 v. and minus 18 v., respectively. They are held to these values by the Zener diodes 251 and 252.

The symmetry control circuit 36 located between the input drive circuit on the final output stage is to adjust the width of the bauds or bits. The input to this circuit is either at +18 v. or −18 v. Considering the input to be +18 v., the capacitor employed according to the setting of switch 134 (shown also in oscillator unit 11 of FIG. 2) will be charged toward −18 v. However, the base of the transistor 253 can only be between approximately +3 v. and −3 v. due to the clamping circuits (diodes 254, 256 and resistance 257). Therefore, the base of transistor 253 will be at its more positive value. This voltage will appear also on the emitter of transistor 253 (emitter follower) and likewise on the emitters of transistors 258 (emitter follower) and 259. Since 259 is an NPN transistor and the base can only be between approximately +2.5 v. and −2.5 v. (adjustment of potentiometer 261), this transistor is reverse biased or cut off and +24 v. will appear on the base of transistor 241 forcing it to the "Off" condition.

As the input changes to −18 v., the capacitor being used starts discharging exponentially toward −18 v. Due to the clamping action, the base of transistor 253 doesn't go below −3 v., which, after going through the cascaded emitter followers, appears on the emitter of transistor 259 and forward biases the NPN transistor 259. This makes the base transistor 241 less than +18 v. and 241 is switched to the "On" condition.

It will be noted that the capacitors that may be chosen are large. They, therefore, give an integrated wave input to the symmetry control circuit rather than the initial squared wave output of the NOR gate. Since only a small portion of the integrated waveform is being used (between ±3 v.), it may be assumed that the rise and fall is nearly linear. The potentiometer 261 permits symmetry adjustment. Being located in the base lead of the NPN transistor 259, it gives a choice as to what level the NPN transistor will switch. With the potentiometer set at the center (base at zero) the transistor 259 will switch at this zero level. Since the integrated waveform depends directly on the changing of the initial squared input wave, the width of the output baud or bit will remain unchanged. However, if the base of transistor 259 is set to a positive value, +2 v., the width of the positive portion of the final output bit will be narrowed. Because the emitter of transistor 259 is more negative for a longer period of time, transistor 259 will be "On" for a longer period.

The reverse end result may be obtained by setting the base lead of transistor 259 to a negative voltage (0 to approximately −2.5 v.). Normal component tolerances may be compensated for by adjusting trimmer potentiometer 257.

Figure 10:
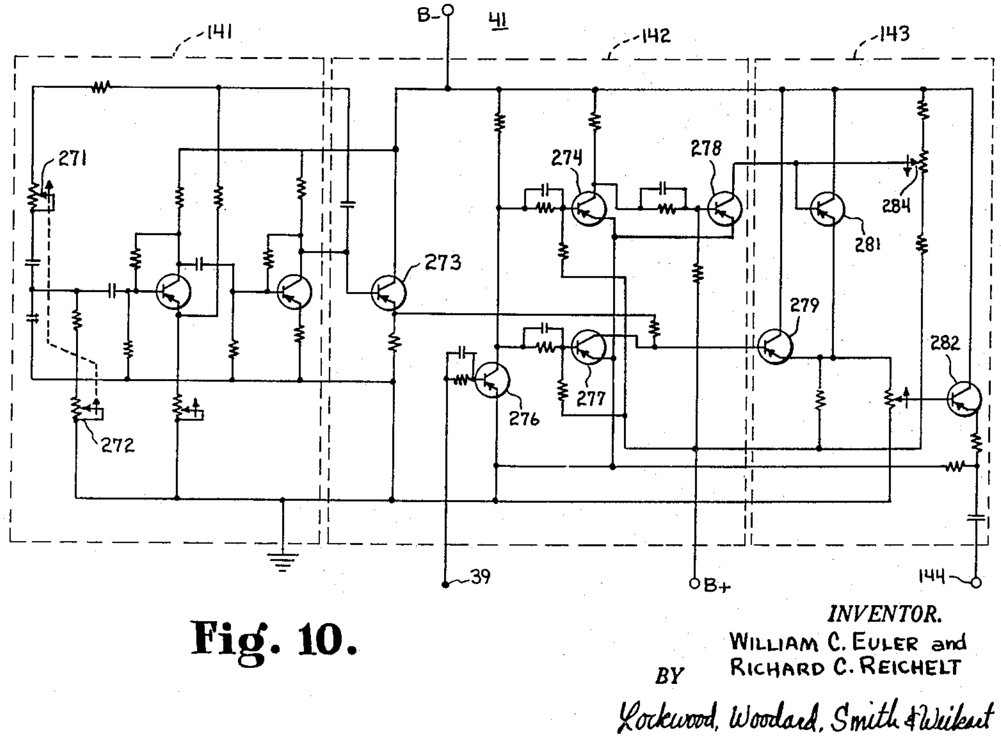
FIG. 10 is a schematic diagram of the Tone Keyer which may be employed in our invention.

Referring to FIG. 10, the first stage of the tone keyer unit 41 is a Wien bridge oscillator 141. Adjusting the two potentiometers 271 and 272 located in the series and parallel arms of the bridge gives the desired frequency of sine wave output. Immediately following the Wien bridge oscillator is a buffer stage, transistor 273. Its prime purpose is to isolate the oscillator from variations in loading. Located in the actual tone keyer 142 are two inverters, transistors 274 and 276, and two keyers or switches, transistors 277 and 278. Two emitter followers, transistors 279 and 281 and a final emitter follower output, transistor 282, comprise the tone output driver 143.

Transistor 276 is used to provide correct phase for the input keying voltage. With a negative level keying voltage input to the tone keyer, transistor 277 will be reverse biased and the sine wave from the Wien bridge oscillator will be applied to the emitter follower, transistor 279, and the sine wave will appear on the final output. The amplitude of the output may be controlled by the tone Output control, potentiometer 283. The negative keying voltage input will also reverse bias the inverter 274 which results in a negative level appearing on the base lead of transistor 278. Transistor 278 will switch to the "On" condition grounding the D.C. balance lead connected to the balance control potentiometer 284 and the base of transistor 281. In this condition a tone (sine wave) will appear at the output.

With a positive level input to the tone keyer, transistor 277 will become forward biased grounding transistor 279. In this condition no sine wave will appear in the final output. The inverter, 274, will also become forward biased which results in transistor 278 becoming reverse biased ungrounding the D.C. balance lead and allowing the correct D.C. level to appear at the final output terminal 144. The Balance control poteniometer 234 makes it possible to position the D.C. level approximately plus or minus 6 v. at the output.

Figure 11:
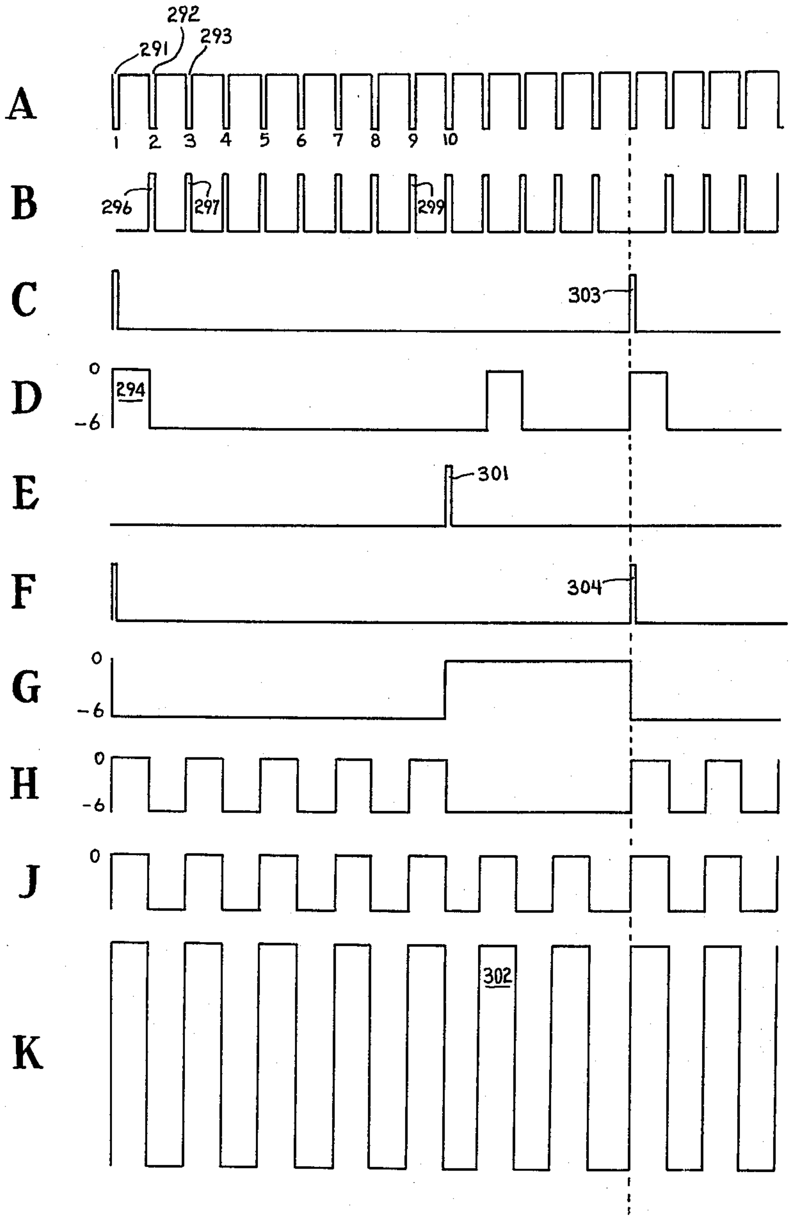
FIG. 11 is a diagram illustrating waveforms typically encountered at various locations in our invention.

Referring to FIG. 11, a set of wave forms is shown and FIG. 11K represents a typical pattern which may be produced at the pattern output terminal, and the other figures illustrate corresponding wave forms existing at different locations in our generator during the production of the illustrated output wave form. The pattern represents one in which the cycle length is fourteen bits and every other bit selector switch is closed.

FIG. 11A represents the negative going clock pulses produced by the oscillator unit on conductor 19, and the intervals between successive pulses will, for descriptive purposes be considered bits. For example, the interval between pulse 291 and 292 is the first bit, that between pulse 292 and 293 is the second bit, and so on.

FIG. 11B represents the positive going pulse output of the units shift drive 48 and which is available on the conductor 59.

FIG. 11C represents the pulse output of the units clear drive 49 and which is available on the conductor 61.

FIG. 11D represents the positive signal output appearing on the output terminal 62 of flip-flop 53 during the first, eleventh and fifteenth bits.

FIG. 11E represents the positive going pulse output of the tens shift drive 72 occurring at the beginning of the tenth bit.

FIG. 11F shows the positive going pulse output of the tens clear drive 73 at the beginning of the first and fifteenth bits.

FIG. 11G represents the output on the terminal 63 of the tens flip-flop 74.

FIG. 11H represents the output of the inverter-AND gate 89.

FIG. 11J represents the output of the NOR gate on conductor 116.

FIG. 11K represents the pattern output of the pattern generator at the terminal 38.

*Operation*

In the operation of the invention, the frequency of the oscillator is established by operation of the range switch 136 together with the vernier switch 139 in the oscillator unit. This, of course, assumes that the internal oscillator will be used for the source of drive pulses and accordingly, the switch 14 is in contact with the fixed contact 13 to connect the internal oscillator 12 with the pulse shaping circuitry 18.

The output of the oscillator is appropriately shaped in the shaping circuitry 18 to produce a clock pulse output on the conductor 19 of the form shown in FIG. 11A.

Assuming that all flip-flops of the ring counters have been cleared, either by a cycle pulse or a reset pulse, the units flip-flop 53 produces an output in the clear condition at terminal 62 which is at the zero level. This is represented by the first block 294 in FIG. 11D which, as is apparent from the illustration, lasts during the first bit. This causes the buffer inverter 67, coupled to the flip-flop 53, to provide a negative voltage to the first bit selector switch 83*a* in the bank 83 coupled to the OR gate 88. Assuming that the first bit selector switch is closed, there will be a negative output from the OR gate 88 to the inverter-AND gate 89. It should be apparent that the outputs of each of the other flip-flops in the units ring counter is at this time of a negative six volt potential.

Simultaneously with the clearing of the units ring counter, the tens ring counter is cleared and a six volt negative potential is produced on the output terminal 63 of the tens flip-flop 74 as illustrated in FIG. 11G. Consequently, the output of the buffer inverter coupled to flip-flop 74 is at the zero level and is coupled to the inverter-AND gate 89. The negative input from OR gate 88 and the zero level input derived from tens flip-flop 74 are effective in the AND gate to produce an output at the zero level to the OR gate 111. This is represented during the first bit in FIG. 11H. The output at terminal 116 of the NOR gate is accordingly at the zero level as represented in FIG. 11J. The output on conductor 114 from the NOR 117 is at the negative level. With the switch 118 of the output unit adjusted as shown in FIG. 2 connecting conductor 114 to the output unit 33, a signal is produced at the pattern output terminal 38 as represented by the first bit portion of the wave form in FIG. 11K.

It should be noted that during the first bit, the condition and the construction of the ring counters is such that the couplings therefrom to the banks of bit selector switches and to the inverter-AND gates can produce a signal output from only the gate 89 and this is true regardless of the positions of the various bit selector switches with the exception of the very first one, i.e., switch 83*a*. The next clock pulse (292 in FIG. 11A) following the clearing of the ring counters produces the first shift drive pulse (296 in FIG. 11B) and initiates the second time interval or bit. This pulse sets flip-flops 53 and 54 placing them both in the unclear or ones state. All other flip-flops will be clear. They will attempt to reset due to the potentials at their inputs 64 and 66, but since they are already in the clear condition, nothing will happen to them. At this time, a potential at the zero level is produced from the output terminal 63 of flip-flop 54 to its buffer inverter stage but because the flip-flop 54 has been placed in the ones state, the potential at its output terminal 62, and which is connected to its buffer-inverter, is at the negative six volt level. The output therefrom is accordingly ineffective at the OR gate 88, even though the first bit selector switch 83*a* is closed. However, the output from the buffer inverter of flip-flop 54 would be effective through the second bit selector switch 83*b* at OR gate 88 if that switch is closed. But assuming that the second bit selector switch is open, there is no negative output available from the OR gate 88 to satisfy the inverter-AND gate 89. Accordingly, the voltage level at the output of the gate 89 is different from what it would be if the second bit selector switch were closed and this is represented in FIG. 11H by the negative potential during the second bit. The corresponding pattern output is also shown in FIG. 11K to be different from that which it otherwise would be if the second bit selector switch were closed.

The next shift drive pulse 297 from the shift drive 48 will clear flip-flop 54 and set flip-flop 56. Flip-flop 53 will remain unclear inasmuch as it cannot be triggered by a shift drive pulse from the unclear state as long as its input terminal 64 is at the zero level and its input terminal 66 is at the six volt negative potential provided by the flip-flop 58 in the clear state. This triggering characteristic was explained in the description of the flip-flop circuit shown in FIG. 3. At this time, after the second shift drive pulse 297, all flip-flops except 53 and 56 are clear and now flip-flop 56 is producing the output to the third bit selector switch which, assuming it is closed, produces a negative input through OR gate 88 to the inverter-AND gate 89. The output from the tens flip-flop 74 remains the same as it was for the first two bits and accordingly, the gate 89 is satisfied and the voltage output at pattern output terminal 38 returns to the level which it had during the first bit. This is illustrated in FIG. 11K.

Subsequent shift drive pulses produce clearing and setting of flip-flops in orderly fashion and the waveforms in FIG. 11 represent the output when every second bit selector switch is closed. After the eighth shift drive pulse (299 in FIG. 11B) which produces a useful digital information output from the flip-flop 57, an output is also taken from the terminal 62 of flip-flop 57 and coupled through conductor 199 to the delay inverter 197. This negative input from the flip-flop 57 together with the negative input from the C-minus source of potential satisfies and AND gate 198 of the delay inverter 197 to produce an output from the delay inverter on conductor 196 which is of a negative potential and delayed approximately one bit from the time of the setting of flip-flop 57 by the eighth shift drive pulse. The output signal from delay inverter 197 arrives at the AND gate 193 simultaneously with the next clock pulse from the oscillator unit and together with a negative potential on conductor 192 satisfies the AND gate 193 to produce a shift drive pulse (301 in FIG. 11E) from the tens shift drive 72. This pulse places the flip-flop 74 and flip-flop 75 in the ones condition whereupon the positive potential is no longer produced at the input to inverter-AND gate 89 by the flip-flop 74. Instead, a positive potential is produced by flip-flop 75 at the inverter-AND gate 89*a*. From this time on until a positive potential is again available from the tens ring counter for the gate 89, no output can be produced by the gate 89 so it will be ineffective with respect to the pattern output.

The next shift drive pulse clears the units flip-flop 58 and also clears flip-flop 53 whereupon flip-flop 53 produces an output which is useful in the first bit selector switch 84*a* of the bank 84 which, if closed, will produce a negative output to the gate 89*a* and produce a positive pulse at the pattern output terminal 38 as represented at pulse 302 for the eleventh bit in FIG. 11K.

Assuming that the cycle length desired is fourteen bits, the pair of ten-position switches 82*a* and 82*b* comprising the units cycle length switch, will be set so that their movable contacts are connected to the fourth fixed contact of each, which in this instance would be contacts 94*a* and 94*b*, respectively. The movable contactor of the switch 82, the tens cycle length switch, would be connected to fixed contact 91. Therefore, as soon as the flip-flop 75 is placed in the ones state by the tens shift drive pulse (301 of FIG. 11E) after the first ten bits, the negative potential at the output terminal 62 thereof is carried through the tens cycle length switch and conductor 151 to the AND gate 152 of the delay inverter 153.

Whenever the fourth flip-flop in the units ring counter is placed in the ones state, the negative output from its buffer inverter is present on the fixed contact 94*b* of the units cycle length switch section 82*b* and coupled therefrom through the movable contactor thereof to the AND gate 152. The appearance of two negative inputs in the AND gate 152 produces an output therefrom to the delay and inverter sections of delay inverter 153. This produces a delayed negative output from the inverter 153, available by way of the cycle switch 163 and through the reset switch 172 in its normal position as shown in FIG. 2 to the AND gate 176 of inverter 177. Accordingly, by the end of the fourteenth bit, a negative signal is available on the conductor 84 and together with the negative pulse from the conductor 19 satisfies the AND gates for the clear drives producing clear drive pulses 303 and 304 as shown at the end of the fourteenth bit in FIGS. 11C and 11F respectively. These clear drive pulses return all flip-flops to the clear condition and initiate a new cycle exactly like the preceding one.

If at any time it is desirable to start a new cycle before completion of a cycle, the movable contactor 173 of the reset switch 172 can be placed in contact with the fixed contact 179 thereof producing a negative input to the AND gate 176 in addition to the constant negative input thereto from the C-minus source of potential. This produces a delayed negative signal input to the clear drives. It should be noted that the satisfaction of the AND gate 176 of the inverter 177, while producing a negative signal on conductor 184, produces a positive signal at the junction 183 which junction is negative at all other times. The positive signal at junction 183 is carried through conductors 194 and 192 to the AND gates of shift drives 48 and 72, respectively, thus preventing shift drive pulses at the time of occurrence of clear drive pulses.

If it is desirable to connect several pattern generators in cascade in order to provide a pattern length of over 100 bits, the cycle switch 183 can be switched to make the output from delay inverter 153 available at terminal 169 and make the input from a delay inverter of another pattern generator useful in this pattern generator by receiving it at the junction 168.

If single cycle operation is desired, this can be accomplished by again having the cycle switch 163 coupling the delay inverter 153 to the output 169, and the reset switch input 166 to the input terminal 168. However, it is necessary that the terminals 168 and 169 be grounded to obtain single cycle operation so shorting plugs are normally employed at terminals 168 and 169 for this purpose.

The symmetry control which may be utilized or bypassed by operation of the switch 37 is useful when employed to control the width of the output pulses in the pattern at terminal 38. This has already been described in the description of FIG. 9.

The tone keyer also described above is useful to produce if desired a sine wave output keyed to the pattern output at terminal 131.

While the invention has been disclosed and described employing, for example, potentials of twenty-four volts, six volts and ground potential and employing usually PNP transistors and decade ring counters, it should be understood that variations could be made by one skilled in the art which would remain within the scope of the invention which scope we wish to be limited only by the following claims.

The invention claimed is:

1. A digital pattern generator comprising: a signal source producing a pulse output establishing a sequence of time intervals; first and second ring counters coupled to said signal source, each of said ring counters having a plurality of flip-flops and each of said flip-flops having an output conductor coupled thereto; a plurality of switches, each switch having output means, and each switch having input means coupled to the output conductor of one of the flip-flops of said first ring counter for switchably coupling said first ring counter to said output means during specific desired time intervals in a sequence of time intervals; converter means including gating means coupled to said output means and to the conductors of said flip-flops of said second ring counter, for co-ordinating signals from said counters to produce output signals in a pattern representative of the switched condition of said switches; and cycle length control means coupled to said ring counters for establishing the number of time intervals constituting a pattern cycle.

2. A digital pattern generator comprising: a signal source producing a clock pulse output establishing a continuous sequence of time intervals; counting means coupled to said signal source and including first and second ring counters; a plurality of manually-operable switches having output means and having input means coupled to said first ring counter for switchably coupling said first ring counter to said output means during specific desired time intervals in a continuous sequence of time intervals; converter means coupled to said output means and said second ring counter for coordinating signals from said counters to produce an output pattern representative of the switched condition of said switches; cycle length control means coupled to said ring counters for establishing the number of time intervals constituting a pattern cycle and initiating repetition of a pattern upon completion of a pattern; switching means coupled to said cycle length control means to provide the option of deactivating the pattern repetition capability of said control; reset means coupled to said switching means to provide the option of initiating a pattern manually; terminal means coupled to said switching means to accommodate coupling of pattern generators in cascade for lengthening the pattern duration capability; and an output unit having input means coupled to said converter means and having pattern output means and including amplifier means and a symmetry control circuit switchably connectable between said input means and said pattern output means for controlling width of output pulses and an output level control coupled to said pattern output means to control the amplitude of pattern output.

3. A digital pattern generator comprising: a signal source producing a clock pulse output establishing a continuous sequence of time intervals; counting means coupled to said signal source and including first and second ring counters; a plurality of manually-operable switches having output means and having input means coupled to said first ring counter for switchably coupling said first ring counter to said output means during specific desired intervals in a continuous sequence of time intervals; converter means coupled to said output means and said second ring counter for co-ordinating signals from said counters to produce an output pattern representative of the switched condition of said switches; cycle length control means coupled to said ring counters for establishing the number of time intervals constituting a pattern cycle and initiating repetition of a pattern upon completion of a pattern; switching means coupled to said cycle length control means to provide the option of deactivating the pattern repetition capability of said control; reset means coupled to said switching means to provide the option of initiating a pattern manually; terminal means coupled to said switching means to accommodate coupling of pattern generators in cascade for lengthening the pattern duration capability; an output unit having input means coupled to said converter means and having pattern output means and including amplifier means and a symmetry control circuit switchably connectable between said input means and said pattern output means for controlling width of output pulses and an output level control coupled to said pattern output means to control the amplitude of pattern output; and a tone keyer unit having an input coupled to said output unit and having output means, to produce at its output means a sinusoidal signal keyed to the pulse pattern.

4. A digital pattern generator comprising: a signal source producing a clock pulse output establishing a continuous sequence of time intervals; counting means coupled to said signal source and including first and second ring counters; a plurality of manually-operable, switches having output means and having input means coupled to said first ring counter for switchably coupling said first ring counter to said output means during specific desired time intervals in a continuous sequence of time intervals; converter means coupled to said output means and said second ring counter for co-ordinating signals from said counters to produce an output pattern representative of the switched condition of said switches; cycle length control means coupled to said ring counters for establishing the number of time intervals constituting a pattern cycle and initiating repetition of a pattern upon completion of a pattern; and an output unit having input means coupled to said converter means and having pattern output means and including amplifier means and symmetry control means coupled between said input means and said pattern output means for controlling output pulses.

5. A digital pattern generator comprising: an oscillator unit for establishing a continuous sequence of time intervals, said oscillator unit including an oscillator, pulse shaping circuitry, signal input means, and a switch for coupling said pulse shaping circuitry alternately to said oscillator and to said signal input means; counting means coupled to said pulse shaping circuitry and including first and second ring counters; a plurality of manually-operable, two position switches having output means and having input means coupled to said first ring counter for switchably coupling said first ring counter to said output means during desired time intervals in a continuous sequence of time intervals; converter means coupled to said output means and said second ring counter for co-ordinating signals from said counters to produce an output representative of the switched condition of said switches; cycle length control means coupled to said ring counters for establishing the number of time intervals constituting a pattern and initiating repetition of a pattern upon completion of a pattern; switching means coupled to said cycle length control means to deactivate the pattern repetition capability of said control; reset means coupled to said switching means to initiate a pattern manually; terminal means coupled to said switching means to accommodate coupling of pattern generators in cascade for lengthening the pattern duration capability; an output unit having input means coupled to said converter means and having pattern output means and including amplifier means and a symmetry control circuit switchably connectable between said input means and said pattern output means for controlling width of output pulses, and an output level control coupled to said pattern output means to control the amplitude of pattern output; and a tone keyer unit coupled to said output unit to produce at an output a sinusoidal signal keyed to the pulse pattern.

6. The generator of claim 5 wherein said symmetry control circuit comprises: a first emitter follower; a clamping circuit coupled to the base of said emitter follower; signal input means including charge accumulating means coupled to the base of said emitter follower; a second emitter follower having a base connected to the emitter of said first emitter follower; a switching transistor having an emitter coupled to the emitter of said second emitter follower and a collector to produce the signal output of the symmetry control circuit; and adjustable biasing means coupled to the base of said switching transistor to provide for adjustment of the symmetry of the pulses in the pattern output of the pattern generator.

7. In a digital pattern generator for producing a series of pulses in predetermined order and repetitive series said generator having ring counters therein driven by a clock pulse source coupled thereto, means for producing a continuous series of outputs in a cycle from repetitious digitial information inputs and comprising: banks of switches, the switches in a bank being coupled individually to a first ring counter to receive individual outputs separately from the counter; an OR gate coupled to each bank of switches; AND gates, each having input means coupled to the output of one of said OR gates and having input means coupled to a second ring counter; and an OR gate having inputs from the AND gates to produce an output pulse pattern wherein the voltage level at every successive time interval between clock pulses is predetermined by settings of said switches.

8. In a digital pattern generator for producing a series of pulses in predetermined order and repetitive series said generator having ring counters therein driven by a clock pulse source coupled thereto, means for producing a continuous series of outputs in a cycle from repetitious digital information inputs and comprising; a first plurality of gating means, each means having an input coupled to a first ring counter to receive digital information outputs therefrom and each means having an input coupled to a second ring counter to receive digital information therefrom, each of said gating means being adapted to produce an output in response to appearance simultaneously at its inputs of signals of predetermined character from said first and second ring counters; and gating means having inputs coupled to the outputs of the gating means of said plurality, and having an output, and adapted to produce an output at a voltage level responsive to inputs from the gating means of said plurality.

9. In a digital pattern generator for producing a series of pulses in predetermined order and repetitive series said generator having ring counters therein driven by a clock pulse source coupled thereto, means for producing a continuous series of outputs in a cycle from repetitious digital information inputs and comprising; a plurality of AND gates, each gate of said plurality having an input coupled to a first ring counter to receive digital information outputs therefrom and each having an input coupled to a second ring counter to receive digital information therefrom, each of said gates being adapted to produce an output in response to appearance simultaneously at its inputs of signals of predetermined character from said first and second ring counters; and an OR gate having inputs coupled to the outputs of the AND gates of said plurality, and having an output, and adapted to produce an output at a voltage level rseponsive to inputs from the AND gates of said plurality.

10. In a digital pattern generator for producing a series of pulses in predetermined order and repetitive series said generator having ring counters therein driven by a clock pulse source coupled thereto and including pluralities of binary means producing digital information, means for producing a continuous series of outputs in a cycle from repetitious digital information inputs and comprising; a plurality of OR gates, individual gates of said plurality having inputs for receiving digital information from the binary means of a first ring counter and having an output; a plurality of AND gates, each gate of said plurality having an input coupled to the output of one of said OR gates to receive digital information outputs from the first ring counter and each gate of said plurality of AND gates having an input coupled to a second ring counter to receive digital information therefrom, each of said AND gates being adapted to produce an output in response to appearance simultaneously at its inputs of signals of predetermined character from said first and second ring counters; and an OR gate having inputs coupled to the outputs of the AND gates of said plurality, and having an output, and adapted to produce an output at a voltage level responsive to inputs from the AND gates.

11. In a digital pattern generator, a logic system comprising: a first ring counter including a plurality of binary signal control means, each having a pair of signal inputs, a pair of conditioning bias inputs, and a pair of signal outputs, one signal output in each of said pairs of outputs providing information, each of two of said binary means having bias inputs coupled to signal outputs of another binary means in a first manner, each of said binary means other than said two having bias inputs coupled to signal outputs of another binary means in a second manner being the reverse of the first manner, a first shift drive unit having inputs coupled to a first AND gate and having an output coupled to one of said signal inputs of each of said binary means, first clear drive unit coupled to a second AND gate and having an output coupled to the other of said signal inputs of each of said binary means, and an output means coupled to like outputs of all of said binary means except one binary means and an output means coupled to the output of said one binary means unlike said like outputs; a second ring counter including a plurality of binary signal control means each having a pair of signal inputs, one and another conditioning bias inputs, and a pair of signal outputs, one signal output in each of said pairs providing information, each of two of said binary means having a bias input coupled to a signal output thereof, one of said two having a bias input at a constant potential, the information signal output of each except two of said binary means being coupled to like ones of said bias inputs of the next succeeding binary means, the other signal output of each except one of said binary means being coupled to said another and like bias input of the next succeeding binary means, a second shift drive unit having inputs coupled to a third AND gate and having an output coupled to one of said signal inputs of each of the binary means in the second ring counter, a second clear drive unit having an input coupled to a fourth AND gate and having an output coupled to the other of said signal inputs of each of the binary means in said second ring counter, and output means coupled to all said information signal outputs of the binary means of said second ring counter; means producing regularly recurring pulses and having a pulse output coupled to said first, second, third and fourth AND gates for actuating said shift drive units and clear drive units to produce shift drive pulses and clear drive pulses respectively, the binary means in said first ring counter producing information output signals individually and in sequence; first and second multiposition switching means coupled to the information signal outputs of all of the binary means in said second ring counter and having an output; third multiposition switching means coupled to the information signal outputs of the binary means of said first ring counter and having an output; a fifth AND gate having inputs coupled to the outputs of said switching means and having an output coupled to first delay means, said delay means having an output; a fourth switching means having a movable switching contact coupled to the output of said delay means, and having a first fixed contact; a fifth switch having a first fixed contact coupled to the first fixed contact of said fourth switch, a second fixed contact coupled to a source of constant potential, and a movable contact normally engaged with the first fixed contact of said fifth switch and engageable with the second fixed contact thereof to provide for a reset function; a sixth AND gate having inputs coupled to the movable contact and second fixed contact of said fifth switch and having an output coupled to said second and fourth AND gates; a seventh AND gate having an input coupled to the signal output of one of said binary means in said first ring counter and having an output; second delay means coupled to the output of said seventh AND gate and having an output coupled to said third AND gate to cause said second shift drive unit to produce a shift drive pulse once each time all of the binary means of said first ring counter have produced an information output signal, a binary means of said second ring counter being thereby caused to produce an information output signal for each pulse from said second shift drive unit, the multiposition switches being positionable to cause production of a clear drive pulse from each of said clear drive units after production of a desired number of information pulses by said binary means, determining a cycle of operation and whereby the duration of a cycle is selectable.

12. In a digital pattern generator, a logic system comprising: a ring counter including a plurality of binary signal control means, each having a pair of signal inputs, a pair of conditioning bias inputs, and a pair of signal outputs, one signal output in each of said pairs of outputs providing information, each of two of said binary means having bias inputs coupled to signal outputs of another binary means in a first manner, each of said binary means other than said two having bias inputs coupled to signal outputs of another binary means in a second manner being the reverse of the first manner, a first shift drive unit having inputs coupled to a first AND gate and having an output coupled to one of said signal inputs of each of said binary means, a first clear drive unit coupled to a second AND gate and having an output coupled to the other of said signal inputs of each of said binary means, and an output means coupled to like outputs of all of said binary means except one binary means and an output means coupled to the output of said one binary means unlike said like outputs; means producing regularly recuring pulses and having a pulse output coupled to said first and second AND gates for actuating said shift drive units and clear drive units to produce shift drive pulses and clear drive pulses respectively, the binary means in said first ring counter producing information output signals individually and in sequence; and a plurality of switches coupled to said ring counter, individual switches in said plurality being coupled to individual information signal outputs of the binary means of said ring counter and having output means, for producing at said output means, signals representative of information in selected ones of the binary means of said ring counter.

13. In a digital pattern generator, a logic system comprising: a first ring counter including a plurality of binary signal control means, each having a pair of signal inputs, a pair of conditioning bias inputs, and a pair of signal outputs, one signal output in each of said pairs of outputs providing information, each of two of said binary means having bias input coupled to signal outputs of another binary means in a first manner, each of said binary means other than said two having bias inputs coupled to signal outputs of another binary means in a second manner being the reverse of the first manner, a first shift drive unit having inputs coupled to a first AND gate and having an output coupled to one of said signal inputs of each of said binary means, first clear drive unit coupled to a second AND gate and having an output coupled to the other of said signal inputs of each of said binary means, and an output means coupled to like outputs of all of said binary means except one binary means and an output means coupled to the output of said one binary means unlike said like outputs; a second ring counter including a plurality of binary signal control means each having a pair of signal inputs, one and another conditioning bias inputs, and a pair of signal outputs, one signal output in each of said pairs providing information, each of two of said binary means having a bias input coupled to a signal output thereof, one of said two having a bias input at a constant potential, the information signal output of each except two of said binary means being coupled to like ones of said bias inputs of the next succeeding binary means, the other signal output of each except one of said binary means being coupled to said another and like bias input of the next succeeding binary means, a second shift drive unit having inputs coupled to a third AND gate and having an output coupled to one of said signal inputs of each of the binary means in the second ring counter, a second clear drive unit having an input coupled to a fourth AND gate and having an output coupled to the other of said signal inputs of each of the binary means in said second ring counter, and output means coupled to all said information signal outputs of the binary means of said second ring counter; first and second multiposition switching means coupled to the information signal outputs of all of the binary means in said second ring counter and having an output; third multiposition switching means coupled to the information signal outputs of the binary means of said first ring counter and having an output; a fifth AND gate having inputs coupled to the outputs of said switching means and having an output coupled to first delay means, said delay means having an output; a fourth switching means having a movable switching contact coupled to the output of said delay means, and having a first fixed contact; a fifth switch having a first fixed contact coupled to the first fixed contact of said fourth switch, a second fixed contact coupled to a source of constant potential, and a movable contact normally engaged with the first fixed contact of said fifth switch and engageable with the second fixed contact thereof to provide for a reset function; a sixth AND gate having inputs coupled to the movable contact and second fixed contact of said fifth switch and having an output coupled to said second and fourth AND gates; means producing regularly recurring pulses and having a pulse output coupled to said first, second, third and fourth AND gates for actuating said shift drive units and clear drive units to produce shift drive pulses and clear drive pulses respectively, the binary means in said first ring counter producing information output signals individually and in sequence; a seventh AND gate having an input coupled to the signal output of one of said binary means in said first ring counter and having an output; second delay means coupled to the output of said seventh AND gate and having an output coupled to said third AND gate to cause said second shift drive unit to produce a shift drive pulse once each time all of the binary means of said first ring counter have produce an information output signal, a binary means of said second ring counter being thereby caused to produce an information output signal for each pulse from said second shift drive unit, the multiposition switches being positionable to cause production of a clear drive pulse from each of said clear drive units after production of a desired number of information pulses by said binary means, determining a cycle of operation and whereby the duration of a cycle is selectable; and a plurality of banks of selector switches, individual ones of said banks having a plurality of switches therein, individual switches of said plurality having input means coupled to individual information signal outputs of the binary means of said first ring counter and having output means, for producing at said output means signals representative of information in selected ones of the binary means of said first ring counter.

14. In a digital pattern generator, a logic system comprising: a first ring counter including a plurality of bistable signal control means, each having a pair of signal inputs, a pair of conditioning bias inputs, and a pair of signal outputs, one signal output in each of said pairs of outputs providing information, each of two of said bistable means having bias inputs coupled to signal outputs of another bistable means in a first manner, each of said bistable means other than said two having bias inputs coupled to signal outputs of another bistable means in a second manner being the reverse of the first manner, a first shift drive unit having inputs coupled to a first AND gate and having an output coupled to one of said signal inputs of each of said bistable means, first clear drive unit coupled to a second AND gate and having an output coupled to the other of said signal inputs of each of said bistable means, and an output means coupled to like outputs of all of said bistable means except one bistable means and an output means coupled to the output of said one bistable means unlike said like outputs; a second ring counter including a plurality of bistable signal control means each having a pair of signal inputs, one and another conditioning bias inputs, and a pair of signal outputs, one signal output in each of said pairs providing information, each of two of said bistable means having a bias input coupled to a signal output thereof, one of said two having a bias input at a constant potential, the information signal output of each except two of said bistable means being coupled to like ones of said bias inputs of the next succeeding bistable means, the other signal output of each except one of said bistable means being coupled to said another and like bias input of the next succeeding bistable means, a second shift drive unit having inputs coupled to a third AND gate and having an output coupled to one of said signal inputs of each of the bistable means in the second ring counter, a second clear drive unit having an input coupled to a fourth AND gate and having an output coupled to the other of said signal inputs of each of the bistable means in said second ring counter, and output means coupled to all said information signal outputs of the bistable means of said second ring counter; means producing regularly recurring pulses and having a pulse output coupled to said first, second, third and fourth AND gates for actuating said shift drive units and clear drive units to produce shift drive pulses and clear drive pulses respectively, the bistable means in said first ring counter producing information output signals individually and in sequence; a sixth AND gate having an input coupled to the information signal output of a bistable means of said first ring counter and having an input coupled to the information signal output of a bistable means of said second ring counter and having an output coupled to a second delay means, said second delay means having an output coupled to said second and fourth AND gates; a fifth AND gate having an input coupled to the signal output of one of said bistable means in said first ring counter and having an output; delay means coupled to the output of said fifth AND gate and having an output coupled to said third AND gate to cause said second shift drive unit to produce a shift drive pulse once each time all of the bistable means of said first ring counter have produced an information output signal, a bistable means of said second ring counter being thereby caused to produce an information output signal for each pulse from said second shift drive unit to cause production of a clear drive pulse from each of said clear drive units after production of a complete sequence of information pulses by the bistable means of both ring counters determining a cycle of operation.

15. In a digital pattern generator, a logic system comprising: a first ring counter including a plurality of binary signal control means, each having a pair of signal inputs, a pair of conditioning bias inputs, and a pair of signal outputs, one signal output in each of said pairs of outputs providing information, each of two of said binary means having bias inputs coupled to signal outputs of another binary means in a first manner, each of said binary means other than said two having bias inputs coupled to signal outputs of another binary means in a second manner being the reverse of the first manner, a first shift drive unit having inputs coupled to a first AND gate and having an output coupled to one of said signal inputs of each of said binary means, first clear drive unit coupled to a second AND gate and having an output coupled to the other of said signal inputs of each of said binary means, and an output means coupled to like outputs of all of said binary means except one binary means and an output means coupled to the output of said one binary means unlike said like outputs; a second ring counter including a plurality of binary signal control means each having a pair of signal inputs, one and another conditioning bias inputs, and a pair of signal outputs, one signal output in each of said pairs providing information, each of two of said binary means having a bias input coupled to a signal output thereof, one of said two having a bias input at a constant potential, the information signal output of each except two of said binary means being coupled to like ones of said bias inputs of the next succeeding binary means, the other signal output of each except one of said binary means being coupled to said another and like bias input of the next succeeding binary means, a second shift drive unit having inputs coupled to a third AND gate and having an output coupled to one of said signal inputs of each of the binary means in the second ring counter, a second clear drive unit having an input coupled to a fourth AND gate and having an output coupled to the other of said signal inputs of each of the binary means in said second ring counter, and output means coupled to all said information signal outputs of the binary means of said second ring counter; signal source means producing regularly recurring pulses and having a pulse output coupled to said first, second, third and fourth AND gates for actuating said shift drive units and clear drive units to produce shift drive pulses and clear drive pulses respectively, the binary means in said first ring counter producing information output signals individually and in sequence; first and second multiposition switching means coupled to the information signal outputs of all of the binary means in said second ring counter and having an output; third multiposition switching means coupled to the information signal outputs of the binary means of said first ring counter and having an output; a fifth AND gate having inputs coupled to the outputs of said switching means and having an output coupled to first delay means, said delay means being adapted to produce a delay of duration corresponding to the time interval between successive pulses produced by said signal source, and said delay means having an output; a fourth switching means for selecting a mode of operation from various possible modes including single pattern, repetitious patterns, and extended length patterns, said fourth switching means having a first movable switching contact coupled to the output of said delay means, a second movable contact, first and second fixed contacts associated with said first movable contact and a third fixed contact associated with said second movable contact, said second and third fixed contacts being coupled to output means to provide for coupling a plurality of generators in cascade and alternately for preventing generation of patterns in repetitive cycles; a fifth switch having a first fixed contact coupled to the first fixed contact of said fourth switch and to the second movable contact of said fourth switch, a second fixed contact coupled to a source of constant potential, and a movable contact normally engaged with the first fixed contact of said fifth switch and engageable with the second fixed contact thereof to provide for a reset function; a sixth AND gate having inputs coupled to the movable contact and second fixed contact of said fifth switch and having an output coupled to said second and fourth AND gates to condition said gates for production of an output to produce clear drive pulses from said clear drive units to initiate a pattern cycle; a seventh AND gate having an input coupled to the signal output of one of said binary means in said first ring counter and having an output; second delay means coupled to the output of said seventh AND gate and having an output coupled to said third AND gate to cause said second shift drive unit to produce a shift drive pulse once each time all of the binary means of said first ring counter have produced an information output signal, a binary means of said second ring counter being thereby caused to produce an information output signal for each pulse from said second shift drive unit, the multiposition switches being positionable to cause production of a clear drive pulse from each of said clear drive units after production of a desired number of information pulses by said binary means, determining a cycle of operation and whereby the duration of a cycle is selectable.

16. In a digital pattern generator, a logic system comprising: a first ring counter including a plurality of binary signal control means, each having a pair of signal inputs, a pair of conditioning bias inputs, and a pair of signal outputs, one signal output in each of said pairs of outputs providing information, each of two of said binary means having bias inputs coupled to signal outputs of another binary means in a first manner, each of said binary means other than said two having bias inputs coupled to signal outputs of another binary means in a second manner being the reverse of the first manner, a first shift drive unit having inputs coupled to a first AND gate and having an output coupled to one of said signal inputs of each of said binary means, first clear drive unit coupled to a second AND gate and having an output coupled to the other of said signal inputs of each of said binary means, and an output means coupled to like outputs of all of said binary means except one binary means and an output means coupled to the output of said one binary means unlike said like outputs; a second ring counter including a plurality of binary signal control means each having a pair of signal inputs, one and another conditioning bias inputs, and a pair of signal outputs, one signal output in each of said pairs providing information, each of two of said binary means having a bias input coupled to a signal output thereof, one of said two having a bias input at a constant potential, the information signal output of each except two of said binary means being coupled to like ones of said bias inputs of the next succeeding binary means, the other signal output of each except one of said binary means being coupled to said another and like bias input of the next succeeding binary means, a second shift drive unit having inputs coupled to a third AND gate and having an output coupled to one of said signal inputs of each of the binary means in the second ring counter, a second clear drive unit having an input coupled to a fourth AND gate and having an output coupled to the other of said signal inputs of each of the binary means in said second ring counter, and output means coupled to all said information signal outputs of the binary means of said second ring counter; signal source means producing regularly recurring pulses establishing a sequence of time intervals and having a pulse output coupled to said first, second, third and fourth AND gates for actuating said shift drive units and clear drive units to produce shift drive pulses and clear drive pulses respectively, the binary means in said first ring counter producing information output signals individually and in sequence; first and second multiposition switching means coupled to the information signal outputs of all of the binary means in said second ring counter and having an output; third multiposition switching means coupled to the information signal outputs of the binary means of said first ring counter and having an output; a fifth AND gate having inputs coupled to the outputs of said switching means and having an output coupled to first delay means, said delay means being adapted to produce a delay of duration corresponding to the time interval between successive pulses produced by said signal source, and said delay means having an output; a fourth switching means for selecting a mode of operation from various possible modes including single pattern, repetitious patterns and extended length patterns, said fourth switching means having a first movable switching contact coupled to the output of said delay means, a second movable contact, first and second fixed contacts associated with said first movable contact and a third fixed contact associated with said second movable contact, said second and third fixed contacts being coupled to output means to provide for coupling a plurality of generators in cascade and alternately for preventing generation of patterns in repetitive cycles; a fifth switch having a first fixed contact coupled to the first fixed contact of said fourth switch and to the second movable contact of said fourth switch, a second fixed contact coupled to a source of constant potential, and a movable contact normally engaged with the first fixed contact of said fifth switch and engageable with the second fixed contact thereof to provide for a reset function; a sixth AND gate having inputs coupled to the movable contact and second fixed contact of said fifth switch and having an output coupled to said second and fourth AND gates to condition said gates for production of an output to produce clear drive pulses from said clear drive units to initiate a pattern cycle; a seventh AND gate having an input coupled to the signal output of one of said binary means in said first ring counter and having an output; second delay means coupled to the output of said seventh AND gate and having an output coupled to said third AND gate to cause said second shift drive unit to produce a shift drive pulse once each time all of the binary means of said first ring counter have produced an information output signal, a binary means of said second ring counter being thereby caused to produce an information output signal for each pulse from said second shift drive unit, the multiposition switches being positionable to cause production of a clear drive pulse from each of said clear drive units after production of a desired number of information pulses by said binary means, determining a cycle of operation and whereby the duration of a cycle is selectable; a plurality of switches having output means and having input means coupled to information signal outputs of said first ring counter for switchably coupling said first ring counter to said output means during specific desired time intervals in a sequence of time intervals; and converter means having inputs coupled to the output means of switches in said plurality and having inputs coupled to information signal outputs of said second ring counter, said converter means having an output and being adapted to produce at said output an electrical energy level representative of the switched condition of said plurality of switches.

17. In a digital pattern generator, a logic system comprising: a first ring counter including a plurality of binary signal control means, each having a pair of signal inputs, a pair of conditioning bias inputs, and a pair of signal outputs, one signal output in each of said pairs of outputs providing information, each of two of said binary means having bias inputs coupled to signal outputs of another binary means in a first manner, each of said binary means other than said two having bias inputs coupled to signal outputs of another binary means in a second manner being the reverse of the first manner, a first shift drive unit having inputs coupled to a first AND gate and having an output coupled to one of said signal inputs of each of said binary means, first clear drive unit coupled to a second AND gate and having an output coupled to the other of said signal inputs of each of said binary means, and an output means coupled to like outputs of all of said binary means except one binary means and an output means coupled to the output of said one binary means unlike said like outputs; a second ring counter including a plurality of binary signal control means each having a pair of signal inputs, one and another conditioning bias inputs, and a pair of signal outputs, one signal output in each of said pairs providing information, each of two of said binary means having a bias input coupled to a signal output thereof, one of said two having a bias input at a constant potential, the information signal output of each except two of said binary means being coupled to like ones of said bias inputs of the next succeeding binary means, the other signal output of each except one of said binary means being coupled to said another and like bias input of the next succeeding binary means, a second shift drive unit having inputs coupled to a third AND gate and having an output coupled to one of said signal inputs of each of the binary means in the second ring counter, a second clear drive unit having an input coupled to a fourth AND gate and having an output coupled to the other of said signal inputs of each of the binary means in said second ring counter, and output means coupled to all said information signal outputs of the binary means of said second ring counter; signal source means producing regularly recurring pulses and having a pulse output coupled to said first, second, third and fourth AND gates for actuating said shift drive units and clear drive units to produce shift drive pulses and clear drive pulses respectively, the binary means in said first ring counter producing information output signals individually and in sequence; first and second multiposition swtiching means coupled to the information signal outputs of all of the binary means in said second ring counter and having an output; third multiposition switching means coupled to the information signal outputs of the binary means of said first ring counter and having an output; a fifth AND gate having inputs coupled to the outputs of said switching means and having an output coupled to first delay means, said delay means being adapted to produce a delay of duration corresponding to the time interval between successive pulses produced by said signal source, and said delay means having an output; a fourth switching means for selecting a mode of operation from various possible modes including single pattern, repetitious patterns and extended length patterns, said fourth switching means having a first movable switching contact coupled to the output of said delay means, a second movable contact, first and second fixed contacts associated with said first movable contact and a third fixed contact associated with said second movable contact, said second and third fixed contacts being coupled to output means to provide for coupling a plurality of generators in cascade and alternately for preventing generation of patterns in repetitive cycles; a fifth switch having a first fixed contact coupled to the first fixed contact of said fourth switch and to the second movable contact of said fourth switch, a second fixed contact coupled to a source of constant potential, and a movable contact normally engaged with the first fixed contact of said fifth switch and engageable with the second fixed contact thereof to provide for a reset function; a sixth AND gate having inputs coupled to the movable contact and second fixed contact of said fifth switch and having an output coupled to said second and fourth AND gates to condition said gates for production of an output to produce clear drive pulses from said clear drive units to initiate a pattern cycle; a seventh AND gate having an input coupled to the signal output of one of said binary means in said first ring counter and having an output; second delay means coupled to the output of said seventh AND gate and having an output coupled to said third AND gate to cause said second shift drive unit to produce a shift drive pulse once each time all of the binary means of said first ring counter have produced an information output signal, a binary means of said second ring counter being thereby caused to produce an information output signal for each pulse from said second shift drive unit, the multiposition switches being positionable to cause production of a clear drive pulse from each of said clear drive units after production of a desired number of information pulses by said binary means, determining a cycle of operation and whereby the duration of a cycle is selectable; a plurality of switches having output means and having input means coupled to information signal outputs of said first ring counter for switchably coupling said first ring counter to said output means during specific desired time intervals in a sequence of time intervals; and converter means comprising a first plurality of gating means, individual gating means of said plurality having inputs coupled to the output means of individual switches of said plurality and having an output and producing an output signal in response to presence of an information signal on any input of said individual gating means, a second plurality of gating means, individual gating means of said second plurality having an input coupled to the output of an individual gating means of said first plurality and having an input coupled to the information signal output of an individual binary means of said second ring counter to receive digital information therefrom, the individual gating means of said second plurality having outputs and being adapted to produce an output signal in response to appearance simultaneously at the inputs thereof of digital information signals of predetermined character, and a gating means having inputs coupled to the outputs of the gating means of said second plurality and having an output and adapted to produce an output signal in response to appearance of a signal at any of its inputs coupled to the output of one of said gating means of said second plurality, whereby a pattern output is produced representative of the condition of the switches in said plurality.

18. In a digital pattern generator, a logic system comprising: a first ring counter including a plurality of binary signal control means, each having signal inputs, biasing inputs, and signal outputs, one signal output in each providing information, a first drive unit having inputs coupled to a first gating means and having an output coupled to one of said signal inputs of each of said binary means for changing the state thereof, a second drive unit coupled to a second gating means and having an output coupled to another of said signal inputs of each of said binary means for placing said binary means in like states, said binary means being coupled to each other for producing like information signal outputs separately and sequentially in response to operation of said first drive unit; a second ring counter including a plurality of binary signal control means each having signal inputs, biasing inputs, and signal outputs, one signal output in each providing information, a third drive unit having inputs coupled to a third gating means and having an output coupled to one of said signal inputs of each of the binary means in the second ring counter for changing the state thereof, a fourth drive unit having an input coupled to a fourth gating means and having an output coupled to another of said signal inputs of each of the binary means in said second ring counter for placing said binary means in like states, said binary means in said second ring counter being coupled to each other for producing like information signal outputs separately and sequentially in response to operation of said third drive unit; signal source means producing regularly recurring pulses and having a pulse output establishing time intervals, said output being coupled to said first, second, third and fourth gating means for actuating said drive units to produce drive pulses, the binary means in said first and second ring counters producing information output signals individually and in sequence, a cycle of operation constituting the production of output signals in sequence in combinations without repetition of a combination; switching means coupled to the information signal outputs of the binary means in said first and second ring counters and having an output; a fifth gating means having inputs coupled to the output of said switching means and having an output coupled to first delay means, said delay means being adapted to produce a delay of duration corresponding to the time interval between successive pulses produced by said signal source, and said delay means having an output coupled to said second and fourth gating means to condition said gating means for production of an output to produce drive pulses from said drive units coupled to said second and fourth gating means to terminate a cycle of operation and initiate a new cycle of operation; a sixth gating means having an input coupled to the signal output of one of said binary means in said first ring counter and having an output; second delay means coupled to the output of said sixth gating means and having an output coupled to said third gating means to cause said third drive unit to produce a drive pulse once each time all of the binary means of said first ring counter have produced an information output signal, a binary means of said second ring counter being thereby caused to produce an information output signal for each pulse from said third drive unit, the switching means being operable to cause production of a drive pulse from each of said second and fourth drive units after production of a desired number of information pulses by said binary means, determining a cycle of operation and whereby the duration of a cycle is selectable.

References Cited in the file of this patent

UNITED STATES PATENTS

| | | |
|---|---|---|
| 2,403,873 | Mumma | July 9, 1946 |
| 2,685,686 | Weld | Aug. 3, 1954 |
| 2,765,403 | Loper et al. | Oct. 2, 1956 |
| 2,918,669 | Klein | Dec. 22, 1959 |
| 3,009,134 | Brosh | Nov. 14, 1961 |
| 3,011,127 | Thatte | Nov. 26, 1961 |